United States Patent [19]

Costa

[11] Patent Number: 4,522,339

[45] Date of Patent: Jun. 11, 1985

[54] IRRIGATION FITTING WITH INSTALLATION BARB AND ASSOCIATED BARB INSTALLATION TOOL

[75] Inventor: Robert B. Costa, Santee, Calif.

[73] Assignee: RIS Irrigation Systems, El Cajon, Calif.

[21] Appl. No.: 500,779

[22] Filed: Jun. 3, 1983

[51] Int. Cl.³ .............................................. B05B 15/00
[52] U.S. Cl. .................................... 239/272; 137/318; 239/600
[58] Field of Search ................ 285/189, 197; 137/318; 29/237; 239/271, 272, 542, 547, 600

[56] References Cited

U.S. PATENT DOCUMENTS

| | | | |
|---|---|---|---|
| 828,625 | 8/1906 | Ogg | 294/99 R X |
| 3,815,831 | 6/1974 | Jooste | 239/542 X |
| 4,021,061 | 5/1977 | Zimmerman | 285/13 |
| 4,284,241 | 8/1981 | Azalbert | 239/272 |

Primary Examiner—Andres Kashnikow
Attorney, Agent, or Firm—Gordon L. Peterson

[57] ABSTRACT

An irrigation fitting cooperable with a tool to penetrate the wall of an irrigation conduit comprising a body having a flow passage therein opening at a first location adjacent one end of the body and at a second location spaced from the first location. One end of the body is shaped to form a piercing point for penetrating the wall of the irrigation conduit. A shoulder is provided on the body intermediate the first and second locations and facing in a direction so that a tool can act against the shoulder to force the piercing point to penetrate the wall of the irrigation conduit. Orienting surfaces are provided on the body adjacent the shoulder for cooperating with the tool to orient the irrigation fitting relative to the tool.

18 Claims, 6 Drawing Figures

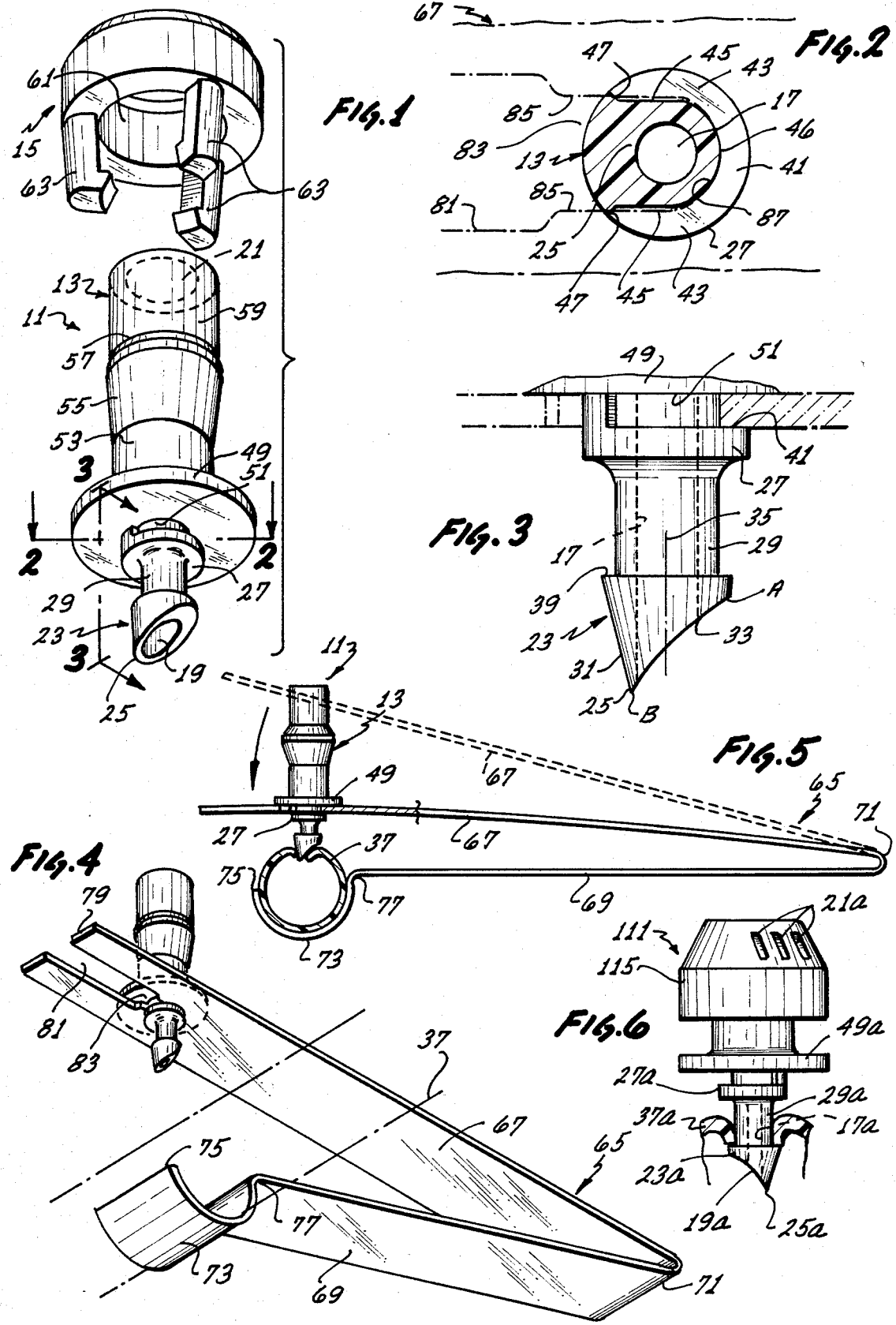

IRRIGATION FITTING WITH INSTALLATION BARB AND ASSOCIATED BARB INSTALLATION TOOL

BACKGROUND OF THE INVENTION

In one common form of irrigation, plastic irrigation conduits are used to distribute the water for irrigation. When this is done, it is necessary to mount various irrigation fittings, such as drip irrigation emitters, sprinklers, and couplings, on the irrigation conduit. To accomplish this, the irrigation fitting is provided with a sharp piercing point which can penetrate the wall of the irrigation conduit. By providing the piercing point on an enlarged head, withdrawal of the irrigation fitting from the irrigation conduit is significantly impeded.

A tool can be used to facilitate forcing of the piercing point of the irrigation fitting through the wall of the irrigation conduit. However, because the size and configuration of irrigation fittings vary widely, it would be necessary to provide a different tool for each different size and configuration of irrigation fitting.

One prior art installation tool comprises first and second jaws and a tube on the first jaw for receiving an irrigation fitting of a particular construction. By moving the jaws toward each other, the piercing point on the irrigation fitting is forced through the irrigation conduit. This tool is not usable with irrigation fittings of other sizes and configurations, and there is some difficulty in penetrating the central portion of the irrigation conduit with the fitting. This is the result of applying the piercing force to the fitting along only one side of the fitting and through a relatively long column. In addition, the fitting may become stuck within the tube of the installation tool.

SUMMARY OF THE INVENTION

This invention provides an irrigation fitting with characteristics which permit the fitting to be installed and oriented by an installation tool regardless of the size, configuration, or nature of the fitting. As used herein, irrigation fitting means drip irrigation emitters, sprinklers, and couplings and includes virtually any device which is adapted to be mounted on an irrigation conduit and have irrigation water flow therethrough.

An irrigation fitting of the type to which this invention is applicable comprises a body having a flow passage therein opening at a first location adjacent one end of the body and opening at a second location spaced from the first location. One end of the body is shaped to form a piercing point for penetrating the wall of the irrigation conduit so that one end of the body can enter the irrigation conduit and the opening adjacent the piercing point can communicate with the interior of the irrigation conduit. The penetration of the piercing point can be through a previously unperforated region of the irrigation conduit or through a previously formed hole; however, the fitting is particularly adapted for puncturing the wall of the irrigation conduit.

To facilitate the application of force to the piercing point, a shoulder is provided on the body with the shoulder facing in a direction so that the installation tool can act against the shoulder. To properly orient the irrigation fitting, orienting means is provided on the body for cooperation with an installation tool to orient the irrigation fitting relative to the tool.

To enable a single, simple installation tool to be used in installing irrigation fittings of different configurations, the shoulder and orienting means are located between the first and second locations, i.e. between the two above mentioned openings of the body of the fitting. Preferably, the shoulder and orienting means are adjacent the piercing point, and in some cases will be closer to the first location than the second location. By so positioning the shoulder and the piercing point, they will not interfere with other design considerations for the irrigation fitting and can be universally used on a wide variety of irrigation fittings. In addition, the length of the column through which the piercing force is applied is reduced.

Although the shoulder can be provided in different ways, in a preferred construction, a flange is provided on the body and the shoulder is on the flange. To provide a resulting piercing force which lies generally along the axis of the body, the shoulder preferably has portions on opposite sides of the body, and in one preferred construction the shoulder is generally U-shaped.

It is important to orient the irrigation fitting relative to the irrigation conduit in two respects. First, for ease of penetration, the piercing point should preferably be aligned with the longitudinal axis of the conduit. Secondly, the angular orientation of the irrigation fitting should be established so that the flow of water through the conduit will have a known effect on the flow through the irrigation fitting. Orientation is accomplished by orienting both the irrigation fitting and the irrigation conduit relative to the installation tool.

The orienting means of the installation fitting can advantageously include generally parallel surfaces, and to simplify the installation tool and minimize the space required on the irrigation fitting, these surfaces are preferably adjacent the shoulder. In a preferred construction, the body also includes means cooperating with the shoulder and the orienting means to define a groove for receiving a region of the tool.

It is desirable that the piercing point be quite sharp, i.e. define a relatively small included angle; however, this elongates the head to increase the resistance to water flow in the irrigation conduit and the turbulence within the conduit. Conversely, a piercing point with a larger included angle is less sharp, but provides a reduced resistance to water flow in the conduit. With this invention, a sharp piercing point is obtained without increasing the resistance to flow in the conduit. This is accomplished by providing a concave face at the end of the body having the piercing point. The concave face increases the sharpness of the piercing point while minimizing the resistance to fluid flow.

The installation tool of this invention can be extremely simple and may comprise first and second jaws and means for coupling the first and second jaws together. The jaws are relatively movable toward and away from each other.

To orient the irrigation conduit relative to the installation tool, the first jaw has a cradle section for holding the irrigation conduit. To orient the irrigation fitting relative to the installation tool, the second jaw has a slot opening at one end of the jaw and projecting inwardly for receiving the orienting means of the irrigation fitting. The slot has a relatively narrow inner portion for cooperating with the orienting surfaces of the irrigation fitting and a relatively wide outer portion for guiding the irrigation fitting into the inner portion. In order to orient the piercing point relative to the irrigation conduit, the narrow portion confronts a central region of the cradle section as viewed in side elevation at least when the first and second jaws are advanced toward each other.

The invention, together with additional features and advantages thereof may best be understood by reference to the following description taken in connection with the accompanying illustrative drawing.

BRIEF DESCRIPTION OF THE DRAWING

FIG. 1 is an exploded isometric view of an irrigation fitting in the form of a coupling constructed in accordance with the teachings of this invention.

FIG. 2 is an enlarged sectional view taken generally along line 2—2 of FIG. 1 with a portion of the installation tool being illustrated in phantom lines.

FIG. 3 is an enlarged fragmentary elevational view of a portion of the coupling with a portion of the installation tool being shown in phantom lines.

FIG. 4 is an isometric view of a preferred form of the installation tool and the coupling with an irrigation conduit being shown in phantom lines.

FIG. 5 is a side elevational view, partially in section, of the coupling, installation tool and irrigation conduit with the piercing point piercing the conduit. The unstressed condition of the installation tool is shown in dashed lines.

FIG. 6 is a side elevational view illustrating an irrigation fitting in the form of a sprinkler coupled to an irrigation conduit.

DESCRIPTION OF THE PREFERRED EMBODIMENTS

FIGS. 1-3 show an irrigation fitting in the form of a coupling 11 which comprises a body 13 and a retaining ring 15. Both the body 13 and the ring 15 may be molded from a suitable plastic material.

The body 13 has an axially extending flow passage 17 which extends completely through the body from an opening 19 at one end of the body to an opening 21 at the other end of the body. The body 13 has an enlarged head 23 at one end which is shaped to form a piercing point 25, a flange 27 spaced axially from the head, and a shank 29 of lesser cross sectional area than the head and the flange integrally joining the head to the flange. Although various constructions are possible, in the embodiment illustrated, the head 23 is defined by a conical surface 31 which is intersected by a concave face 33. The concave face 33 intersects the conical surface 31 at the lower end (as viewed in FIGS. 1 and 3) of the body 13 to form a cutting edge, which is referred to herein as the piercing point 25. In the embodiment illustrated, the concave face 33 is curved; however, the concave face 33 could be formed by two or more straight or curved planes, if desired or it could be planar. It should be noted that a line between the opposite ends A and B of the concave face 33 as viewed in side elevation (FIG. 3) forms an acute angle with the axis 35 of the flow passage 17.

The head 23 is adapted to puncture and penetrate the wall of an irrigation conduit 37 (FIG. 5). The head 23 has an annular shoulder 39 for impeding withdrawal of the head from the irrigation conduit and the axial dimension of the shank 29 should be greater than the wall thickness of the irrigation conduit. Because the typical wall thickness of the conduit 37 is relatively small, the flange 27 can be closely adjacent the head 23.

The flange 27 has a generally U-shaped shoulder 41 (FIGS. 2 and 3) on its upper surface as viewed in FIG. 3. The shoulder 41 has generally opposite legs 43 on opposite sides of the body 13. The shoulder 41 is substantially closer to the opening 19 than to the opening 21; although this relationship is not essential.

The body 13 has orienting means adjacent the shoulder for use in orienting the coupling 11. Although different constructions are possible, in the embodiment illustrated, the orienting means includes parallel orienting surfaces 45 contiguous the shoulder 41 and extending upwardly (as viewed in FIGS. 2 and 3) from the legs 43, respectively and away from the opening 19 and curved orienting surface 46. The orienting surfaces 45 terminate in diverging surfaces 47, the purpose of which is described herein below. In the construction shown in FIGS. 1-3, the surfaces 45, 46 and 47 are exterior peripheral surfaces of the body 13.

An enlarged annular flange 49 integral with the body 13 cooperates with the flange 27, the orienting surfaces 45 and the diverging surfaces 47 to define a groove 51 which is generally U-shaped as shown in FIG. 2. The axial dimension of the groove 51 is relatively small as shown in FIG. 3.

The particular features of the coupling 11 which enable it to couple two conduits together form no part of this invention, except to illustrate that the features of this invention are fully applicable to couplings. In the form illustrated, the body includes a cylindrical surface 53, conical surfaces 55 and 57, and a cylindrical surface 59. The retaining ring 15 cooperates with the body 13 and includes a generally conical axial passage 61 and three circumferentially spaced fingers 63 which are inclined radially inwardly as they project axially away from the conical passage 61. The conical passage 61 is large enough to enable the ring 15 to fit over the largest diameter portion of the body 13 above the flange 49 with sufficient clearance to receive an irrigation conduit (not shown) therebetween.

In use, the ring 15 is moved downwardly until the ends of the fingers 63 engage the flange 49 and an irrigation conduit is slipped over the cylindrical surface 59, the conical surfaces 57 and 55 and a portion of the cylindrical surface 53. The ring 15 is then moved upwardly as viewed in FIG. 1 to squeeze the irrigation conduit between the conical surface 55 and at least a portion of the surface which defines the conical passage 61. Coupling action of this type is shown in Zimmerman U.S. Pat. No. 4,021,061 and is merely illustrative of one form of coupling with which the present invention can be utilized.

The coupling 11 can be installed on the irrigation conduit 37 using an installation tool 65 (FIGS. 4 and 5). Although various constructions are possible in the embodiment illustrated, the tool 65 is formed from an integral metal strap, and it comprises jaws 67 and 69 integrally coupled together by a bend section 71. The jaws 67 and 69, which are aligned with each other, form a V in the unstressed condition. The resilience of the metal strap permits the jaws to be moved toward each other as shown in FIG. 5.

To orient the irrigation conduit 37 relative to the tool 65, the jaw 69 has a cradle section 73 at its free end. The cradle section 73 is approximately semi-cylindrical and is sized to receive the irrigation conduit 37. The cradle section 73 has a outer edge 75 and an inner edge 77. When the irrigation conduit 37 is received in the cradle section 73, the longitudinal axis of the irrigation conduit is perpendicular to the longitudinal axis of the jaw 69.

The jaw 67 has an outer end 79 and a slot having a relatively wide outer portion 81 opens at the outer end 79. The outer portion 81 of the slot projects inwardly away from the end 79 to a relatively narrow inner portion 83 of the slot which has parallel edges 85 and a curved inner end 87 (FIG. 2). The inner portion 83 confronts a central region of the cradle section 73 as viewed in side elevation (FIG. 5) when the jaws 67 and 69 are advanced toward each other. The longitudinal axis of the outer portion 81 and the inner portion 83 of the slot lies along the longitudinal axis of the jaw 67.

To use the tool 65 to install the coupling 11, the groove 51 is placed in the outer portion 81 of the slot and the coupling 11 is slid through the outer portion of the slot and into the inner portion 83 of the slot. However, because of the configuration of the orienting surfaces 45 and 46 and because of the diverging surfaces 47, the groove 51 must enter the inner portion 83 of the slot in a predetermined angular orientation as shown in FIG. 2. Specifically, the diverging surfaces 47 prevent entry of the groove 51 into the inner portion 83 of the slot 180° out of its correct position. In addition, the parallel orienting surfaces 45 cooperate with the parallel edges 85 to angularly orient the coupling 11 with respect to the jaw 67. The diverging surfaces 47 form an interference fit with the edges 85 to frictionally retain the coupling 11 in the inner portion 83 of the slot. The position or orientation of the coupling 11 along the longitudinal axis of the jaw 67 is controlled by the engagement of the orienting surface 46 with the end 87 of the slot.

With coupling 11 and the irrigation conduit 37 retained and oriented by the tool 65, the jaws 67 and 69 can be manually moved toward each other. This brings the piercing point 25 into contact with the irrigation conduit 37 at the 12 o'clock position as viewed in FIG. 5, i.e. directly above the longitudinal axis of the conduit to pierce the conduit and mount the coupling on the conduit in an oriented position with the wall of the conduit engaging the shank 29.

The orientation of the surfaces 45 and 46 relative to the point 25 and the face 33 is such that the direction of flow in the conduit 37 is in the plane of the face 33. The surfaces are perpendicular to the direction of flow in the conduit and the plane of the face 33. The point 25, as viewed in plan, is half way between the surfaces 45.

FIG. 6 shows an irrigation fitting in the form of a sprinkler 111 having the universal mounting means of this invention thereon. Portions of the sprinkler 111 corresponding to portions of the coupling 11 are designated by corresponding reference numerals followed by the letter "a."

The sprinkler 111 is mounted on a conduit 37a. The conduit 37a supplies water to the sprinkler 111. The sprinkler 111 is identical to the coupling 11, except that the sprinkler 111 is adapted to spray irrigation water rather than couple irrigation conduits together. Thus, the coupling 11 has a sprayhead 115 which contains a plurality of openings 21a around its periphery through which water is discharged to the environment.

From the piercing point 25a upwardly through the flange 49a, the sprinkler 111 may be identical to the coupling 11. The particular features which enable the irrigation water to be conveyed from the opening 19a through the flow passage 17a out through the opening 21a may be conventional and form no part of this invention.

Although exemplary embodiments of the invention have been shown and described, many changes, modifications and substitutions may be made by one having ordinary skill in the art without necessarily departing from the spirit and scope of this invention.

I claim:

1. An irrigation fitting cooperable with an installation tool to penetrate the wall of an irrigation conduit, said irrigation fitting comprising:

a body having a flow passage therein opening at a first location adjacent one end of the body;

said one end of said body being shaped to form a piercing point for penetrating the wall of the irrigation conduit whereby said one end of said body can enter the irrigation conduit and the opening can communicate with the interior of the irrigation conduit;

said flow passage opening at a second location spaced from said first location;

a shoulder on said body intermediate said first and second locations so that the installation tool can be moved generally radially of the fitting over the shoulder to engage the shoulder to force the piercing point to penetrate the wall of the irrigation conduit; and orienting means on said body intermediate said shoulder and said second location and adjacent the shoulder for engaging the installation tool when the installation tool engages the shoulder to angularly orient the irrigation fitting relative to the installation tool.

2. An irrigation fitting as defined in claim 1 wherein said shoulder is closer to said first location than said second location.

3. An irrigation fitting as defined in claim 1 wherein said shoulder has portions on opposite sides of the body.

4. An irrigation fitting as defined in claim 1 wherein said orienting means includes generally parallel surfaces adjacent the shoulder.

5. An irrigation fitting as defined in claim 1 wherein said orienting means includes surface means on the body contiguous the shoulder.

6. An irrigation fitting as defined in claim 1 including means cooperating with the shoulder and the orienting means to define a groove for receiving a region of the installation tool.

7. An irrigation fitting as defined in claim 6 wherein said cooperating means includes a flange which projects radially beyond the shoulder.

8. An irrigation fitting as defined in claim 1 including a flange on said body and wherein said shoulder is on said flange.

9. An irrigation fitting as defined in claim 8 wherein an end portion of the body adjacent said one end forms a head and said body has a shank of lesser cross sectional area than said head and said shank joins the head to the flange.

10. An irrigation fitting as defined in claim 1 wherein said body at said one end has a concave face at which the flow passage opens at said one location and a line between the opposite ends of the face as viewed in side elevation forms an acute angle with the axis of the flow passage.

11. An irrigation fitting as defined in claim 1 wherein said fitting includes means for coupling the fitting to a second irrigation conduit.

12. An irrigation fitting as defined in claim 1 wherein said fitting includes means for discharging water received from the irrigation conduit to the environment.

13. An irrigation fitting cooperable with an installation tool to penetrate the wall of an irrigation conduit, said irrigation fitting comprising:
   a body having a flow passage therein opening at a first location adjacent one end of the body;
   said one end of said body being shaped to form a piercing point for penetrating the wall of the irrigation conduit whereby said one end of said body can enter the irrigation conduit and the opening can communicate with the interior of the irrigation conduit;
   said flow passage opening at a second location spaced from said first location;
   a shoulder on said body intermediate said first and second locations and facing in a direction so that the installation tool can act against the shoulder to force the piercing point to penetrate the wall of the irrigation conduit;
   orienting means on said body intermediate said first and second locations and adjacent the shoulder for cooperating with the installation tool to orient the irrigation fitting relative to the installation tool;
   a flange on said body, said shoulder being on said flange;
   an end portion of the body adjacent said one end forming a head and said body having a shank of lesser cross sectional area than said head and said shank joining the head to the flange; and
   said shoulder being generally U-shaped and having generally opposite legs and said orienting means including generally parallel surfaces extending from the legs of the shoulder.

14. An irrigation fitting as defined in claim 13 whrein said orienting means is adapted to be received by a slot on the tool and said fitting includes surface means adjacent the generally parallel surfaces for forming an interference fit with the tool.

15. An irrigation fitting cooperable with an installation tool to penetrate the wall of an irrigation conduit, said irrigation fitting comprising:
   a body having a flow passage therein opening at a first location adjacent one end of the body;
   said one end of said body being shaped to form a piercing point for penetrating the wall of the irrigation conduit whereby said one end of said body can enter the irrigation conduit and the opening can communicate with the interior of the irrigation conduit;
   said flow passage opening at a second location spaced from said first location;
   a shoulder on said body intermediate said first and second locations and facing in a direction so that the installation tool can act against the shoulder to force the piercing point to penetrate the wall of the irrigation conduit; and
   orienting means on said body intermediate said first and second locations and adjacent the shoulder for cooperating with the installation tool to angularly orient the irrigation fitting relative to the installation tool in only one predetermined angular position.

16. An irrigation fitting as defined in claim 15 including means cooperating with the shoulder and the orienting means to define a groove for receiving a region of the installation tool.

17. An irrigation fitting cooperable with an installation tool to penetrate the wall of an irrigation conduit, said irrigation fitting comprising:
   a body having a flow passage therein opening at a first location adjacent one end of the body;
   said one end of said body being shaped to form a piercing point for penetrating the wall of the irrigation conduit whereby said one end of said body can enter the irrigation conduit and the opening can communicate with the interior of the irrigation conduit;
   said flow passage opening at a second location spaced from said first location;
   a generally U-shaped shoulder on said body intermediate said first and second locations and facing in a direction so that the installation tool can act against the shoulder to force the piercing point to penetrate the wall of the irrigation conduit, said shoulder having generally opposite legs; and
   orienting means on said body intermediate said first and second locations and adjacent the shoulder for cooperating with the installation tool to angularly orient the irrigation fitting relative to the installation tool, said orienting means including generally parallel surfaces adjacent said legs, respectively.

18. An irrigation fitting cooperable with an installation tool to penetrate the wall of an irrigation conduit, said irrigation fitting comprising:
   a body having a flow passage therein opening at a first location adjacent one end of the body;
   said one end of said body being shaped to form a piercing point for penetrating the wall of the irrigation conduit whereby said one end of said body can enter the irrigation conduit and the opening can communicate with the interior of the irrigation conduit;
   said flow passage opening at a second location spaced from said first location;
   a shoulder on said body intermediate said first and second locations and facing in a direction so that the installation tool can act against the shoulder to force the piercing point to penetrate the wall of the irrigation conduit;
   orienting means on said body intermediate said first and second locations and adjacent the shoulder for cooperating with the installation tool to at least partially orient the irrigation fitting relative to the installation tool; and
   said body at said one end having a concave face at which the flow passage opens at said one location and a line between the opposite ends of the face as viewed in side elevation forms an acute angle with the axis of the flow passage.

* * * * *